(12) United States Patent
Ali

(10) Patent No.: US 11,547,121 B2
(45) Date of Patent: Jan. 10, 2023

(54) METHOD OF CONCENTRATION OF FLUID MILK USING RENEWABLE ENERGY

(71) Applicant: Ali Fadlelmula Mohamed Ali, Hofuf (SA)

(72) Inventor: Ali Fadlelmula Mohamed Ali, Hofuf (SA)

(*) Notice: Subject to any disclaimer, the term of this patent is extended or adjusted under 35 U.S.C. 154(b) by 0 days.

(21) Appl. No.: 17/134,735

(22) Filed: Dec. 28, 2020

(65) Prior Publication Data

US 2021/0212333 A1    Jul. 15, 2021

Related U.S. Application Data

(60) Provisional application No. 62/959,019, filed on Jan. 9, 2020.

(51) Int. Cl.
*A23C 1/00* (2006.01)
*A23C 3/02* (2006.01)

(52) U.S. Cl.
CPC . *A23C 1/00* (2013.01); *A23C 3/02* (2013.01)

(58) Field of Classification Search
CPC ................................. A23C 1/00; A23C 3/02
See application file for complete search history.

(56) References Cited

U.S. PATENT DOCUMENTS

| | | | |
|---|---|---|---|
| 3,198,713 A * | 8/1965 | McCormick | C12M 23/10 435/305.1 |
| 2013/0196368 A1 * | 8/2013 | Moreno | C12M 25/02 435/34 |

OTHER PUBLICATIONS

Unknown author, Swirling Milk [Online], published 2006, [retrieved on Nov. 30, 2021], Retrieved from the Internet: <URL: https://omsi.edu/sites/all/FTP/files/chemistry/U8WhatsInMilk_OpGuide.pdf> (Year: 2006).*

Hyfoma, Pasteurization, sterilization, UHT [Online], published Dec. 2, 2016, [retrieved on Nov. 30, 2021], Retrieved from the Internet: <URL: https://www.safefoodfactory.com/en/knowledge/25-pasteuriseren-steriliseren-uht-en/> (Year: 2016).*

Mikolajcik, "Bacil in Milk. I. Spore Germination and Growth", J. Dairy Science, 1968, 51, pp. 1579-1582 (Year: 1968).* myreceipes.com, How Long Can Milk Be Out of the Fridge? [Online], published Jun. 7, 2018, [retrieved on Nov. 30, 2021], Retrieved from the Internet: <URL: https://www.allrecipes.com/article/how-long-can-milk-be-out-fridge/ > (Year: 2018).*

* cited by examiner

*Primary Examiner* — Changqing Li
(74) *Attorney, Agent, or Firm* — Bay State IP, LLC

(57) ABSTRACT

A method used for concentration of fluid milk by renewable energy (RE). RE used in the present invention is sole solar energy (SE) at room temperature (25° C.-27° C.). A device of two glass Petri dishes of same size is arranged as upper and lower plates. A volume of 60 ml of pasteurized bovine or camel milk is put in the upper plate and 60 ml of tap water in the lower plate. The device is placed on the bench beside window to be exposed to sunlight, but not to direct sunrays, at room temperature. After about 30 mins water droplets started to appear on the lower face of the upper plate and increased in size with time. With continuous collection of water droplets for 24 hours, 50% of water is removed i.e. giving 50% concentration of milk; after 48 hours the concentration is 16.67%.

7 Claims, 3 Drawing Sheets

METHOD OF CONCENTRATION OF FLUID MILK USING RENEWABLE ENERGY

CROSS REFERENCE TO RELATED APPLICATION

This application claims the benefit of and takes priority from U.S. Provisional Application Ser. No. 62/959,019 filed on Jan. 9, 2020, the contents of which are herein incorporated by reference.

BACKGROUND OF THE INVENTION

Field of the Invention

The invention herein relates to a method of concentration of fluid milk using renewable energy.

Description of the Related Art

Removal of water from fluid milk, in the present invention, is based on studies of intracellular water which proposed existence of two forms of liquid water; not one form as is widely accepted. We utilized the fact of the existence of two forms in bulk water and used solar energy to extract water from fluid milk. By infrared spectroscopy technique, hydrogen bonding strength in intracellular water was studied. The study revealed that water forms two structural types as there are only two distinct hydrogen bond strengths i.e. water exists as networks of molecules interconnected by hydrogen bonds (Wiggins and van Ryn, 1986). Theory of co-existence of micro-domains of different densities shows that H atom lies on a straight line between two O atoms, keeping molecules apart and water less dense, in a structured form of low density water (LDW). The other form, where H bonds are weak and bent allowing molecules to approach each other and increase density, is non-structured high density water (HDW). The important difference from classical osmotic theory is that in two-state water, pressure gradients displace the water equilibrium in either way. When the pressure is positive inducing HDW and/or when the pressure is negative inducing LDW.

Both ions of a neutral salt must occupy the same type of micro-domain determined by the relative potencies of the individual ions in a form of chaotropes or kosmotropes. For example, $CaSO_4$ is sparingly soluble partly because both $Ca^{2+}$ and $SO_4^{2-}$ are potent kosmotropes, requiring a large displacement of the water equilibrium. $CaCl_2$, on the other hand is highly soluble, partly because $Cl^-$ is a chaotrope, so that the displacement of the water equilibrium by $Ca^{2+}$ is corrected by an opposite displacement by $2Cl^-$. The outcome is that both $CaCl_2$ and $CaSO_4$ partition into HDW but $CaSO_4$ much more strongly than $CaCl_2$ (Wiggins, 2008).

The biopolymers fixed charges at the cellular level, are always strong chaotropes (large univalent anionic or cationic groups), inducing HDW in the double layer. When the counter-ion is also a chaotrope the cumulative effect is such that water adjacent to the surface appears to become pure HDW and compensation for the pressure gradient consists predominantly in induction of LDW. To quote few examples: cations show a preference for LDW in the order: $Cs^+>K^+>Na^+>Li^+>H^+$. The break occurs between $K^+$ and $Na^+$; i.e. $K^+$ is a chaotrope and $Na^+$ is a kosmotrope. Univalent anions show the same trends. Their order is $I^->Br^->Cl^->F^-$. Here, the break is between $Cl^-$ and $F^-$. The only differences between the ions on either side of the break is size. In sodium chloride NaCl, $Na^+$ is a kosmotrope and $Cl^-$ is a chaotrope, so the displacement of water equilibrium by $Na^+$ is corrected by opposite displacement by $Cl^-$ leading to induction of LDW formation.

Hydrophobic molecules and small cations such as $Na^+$, $Li^+$, $H^+$, $Ca^{2+}$, $Mg^{2+}$ have an affinity for HDW, it will attract some HDW to its surface, increasing the amount of HDW on the layer surface. On the other hand, most anions have an affinity for LDW but cannot generate LDW immediately at the surface because that region is under positive pressure. It follows that water immediately adjacent to a surface is always HDW, irrespective of the particular properties of the surface, and towards the bottom LDW predominates.

Cow's milk is essentially a dietary supplement for young calves. Milk is principally composed of water which makes up approximately 87%. Total solids in milk are distributed as fats average is 3.9, protein 3.4, lactose 4.8 and minerals 0.8%.

The one-humped camel (*Camelus dromedaries*) inhabits the arid and semi-arid zones of the Middle East and Africa. Overall population of camel in the Kingdom of Saudi Arabia (KSA) is 0.560 million and it ranked sixth in the world. Camel's milk is extensively consumed by the nomads as fresh, raw, soured or processed into cheese (Kudi et al., 1997). Camel milk is generally opaque white (Yagil and Etzion, 1980). It has a sweet and sharp taste, but sometimes it is salty (Rao et al., 1970). When shaken it may be frothy (Shalash, 1979). The changes in taste are caused by the type of fodder and the availability of drinking water. Camel milk is somehow different from cow milk in its chemical composition, but it contains all essential nutrients as cow milk (Elagamy et al., 1996).

It has been demonstrated that camel milk differs from cow milk as it can be preserved for a longer time at 30° C. An important quality is that camel milk can be kept at 4° C. for more than three months without any visible change (Yagil et al., 1978). The milk protein lactoferrin, which present in large quantities in camel milk (ten times higher than in cow milk), has some anti-viral and anti-bacterial properties (Quan et al., 2008). The preparation of butter from camel milk is not as easy as from milk of other animals owing to its unique milk-fat properties. The fat is distributed as small micelle-like globules in the milk. In addition, the fat is apparently bound to protein and there is a great difference in fatty acid composition (Yagil and Etzion, 1980).

Various techniques to concentrate fluid milk and juices were described since 1852 when Borden, a young American dairy farmer, determined that fluid milk consists of 87% water by volume. He boiled the water off the milk top and eventually obtained condensed milk that resisted spoilage. As the method was developed before the advent of refrigeration, it gained popularity and developed in large-scale industrial production.

Conventional air-drying is an old method used to preserve foods where the material to be dried is exposed to a hot stream of air to evaporate moisture. Air-drying offers dehydrated products with their shelf life being extended by a year, but the quality of products is usually drastically diminished compared to that of the original foodstuffs (Ciurzyńska and Lenart, 2011).

Evaporation is the process of heating fluid milk to the boiling point to get rid of water vapour. Evaporation is used as means to pre-concentrate foods (for example fruit juice, milk and coffee) prior to drying. The relatively severe heat treatment necessary for evaporation result in irreversible changes to food quality. Evaporation is more expensive in energy consumption than other methods of concentration (membrane concentration and freeze concentration). A substantial amount of energy is needed to remove water from foods by boiling (2257 kJ are needed per kilogram of water evaporated at 100° C.). Aroma compounds that are more volatile than water in foods, are thus lost during evaporation. This reduces the sensory characteristics of most concentrates for example in fruit juices this results in a loss of flavour, (Anon., 1981).

Evaporated and condensed milk are types of concentrated milk from which the water has been removed. Concentrated milk was first developed in the mid-1800s to keep milk from become spoiled and increase shelf life. Regular evaporated milk is milk concentrated to one-half or less its original volume by evaporation under high pressures and temperatures, with no added sugar. Condensed milk is evaporated milk with the addition of sugar.

The process of fluid milk concentration starts with receiving raw milk which should be of very good quality in order to ensure that it is free from any heat resisting microorganisms. The heat stability of concentrated milk may be improved by preheating either at 95-100° C. for few minutes (5-10) or at 140-145° C. with no holding time. Then the milk is homogenized because fat separation in evaporated milk during storage is a major defect. Homogenization of condensed milk can reduce or eliminate this defect. Homogenization refers to a process of forcing milk under pressure through equipment called homogenizer. The homogenizer reduces the mean size of the fat globules in the milk by forcing through a small orifice at a high pressure by means of a positive displacement pump. In this way the fat globules are uniformly distributed in milk and do not rise to the top to form the creamy layer during storage. In raw milk, the diameters of the fat globules vary from 1 to 20 micron while a diameter of about 2 micron or less is required to keep the fat distributed uniformly. Then the milk is exposed to a process of sterilization to destroy vegetative bacteria and spores to preserve the product for a longer time. In addition, sterilization process is also used to increase the viscosity and improve body and texture to give a creamy consistency to the product. After homogenization, milk is distributed in cans and sterilized. Sterilization is brought about by raising the temperature of concentrated milk rapidly to 116-118° C. and held at this temperature for 15 minutes and then cooled.

The removal of water from foods has many advantages. It provides microbiological stability, reduces deteriorative chemical reactions and reduces transportation and storage costs. Both evaporation and dehydration are methods used in the dairy industry for this purpose. Dehydration refers to the nearly complete removal of water from foods to a level of less than 5%. The liquid food is generally pre-concentrated by evaporation to economically reduce the water content. The concentrate is then dehydrated by introducing as a fine spray or mist into a tower or chamber with heated air.

Milk is heat sensitive, so heat destruction can be minimized by decreasing the boiling point by evaporation in vacuum. The method of evaporated milk consists of concentrating-milk in a vacuum vessel out of contact with the atmosphere, to prevent decomposition, or any harmful change in the ingredients of the milk during the process of evaporation. A vacuum-pan has long been used for the concentration of saccharine syrups and refining sugar, to prevent discoloration by a high degree of heat. Newton and many others since have obtained patents for concentrating milk by various modes of evaporation and combining it with sugar to render it soluble and preservative.

From the above review of techniques used to produce concentrated milk, it is apparent that heat destruction in the process of evaporation is a major demerit. It affects the milk ingredients by induction of harmful changes besides the process being expensive because substantial amount of energy is needed. A technique that would avoid using heat in producing concentrated food items like milk and fruit juice could be appealing to dairy and food industries. An additional advantage is utilizing sunlight energy only in the process which is available in KSA. Such a technique is the subject of the present invention.

SUMMARY OF THE INVENTION

The present invention relates to a method of concentration of bovine fluid milk in which pasteurized milk is obtained from commercial source and treated in bench-scale experiments. Water in fluid milk can be filtered by the present invention to give concentrated milk using renewable energy.

In the present invention SE is utilized for concentration of milk. Making use of the fact that ordinary bulk water exists in two kinds: HDW and LDW prompted us to think of the present invention. For instance, in the upper container the positively-charged HDW lies in upper position and towards the container's bottom lies the negatively-charged LDW. So a device was arranged to consist of a lower container and fixed above it an upper container where the same conditions prevail in both. Hence, the positively-charged HDW ions in the lower container attracted the negatively-charged LDW ions in the upper container through the bottom of the upper container that function as filter to provide fresh droplets water free of solute. Beside the power of "unlike poles attract" that induce emergence of circular water droplets through glass material in the bottom of the upper container, in the present invention, may be interpreted by the "quantum tunneling state" of the water. Discovery of this state of water contributes to the knowledge of utilization of energy by water. It has been reported that quantum tunneling allows particles to move through energy barriers and verified using neutron scattering technology (Kolesnikov et al., 2016).

To achieve the above purpose, in one embodiment, glass Petri dishes consists of two plates of same size, arranged in a device as upper and lower plates. A volume of 60 ml of pasteurized milk is put in the upper plate and 60 ml of tap water in the lower plate.

The device arranged in step 2, is placed on the bench beside window to be exposed to sunlight, but not to direct sunrays, at room temperature. After about 30 mins water droplets started to appear on the lower face of the upper plate. Water droplets increase in size with time. The obtained water droplets are collected in sterile container for analysis. Immediately after collection, new water droplets start to form. Leave the device on place, with continuous collection of droplet water, for 24 hours. After the observation period, the volume of milk in the upper plate, is about 30 ml, i.e. 30 ml of water is removed from milk giving concentration of 50%. In a set of experiments, it was observed that increasing the diameter of Petri dishes will increase the rate of milk concentration.

In one embodiment, bovine raw fresh milk is obtained from private farms and pasteurized at 100° C. for 10 minutes. A device similar to that described in step 2 is arranged with 60 ml milk in upper plate and 60 ml tap water in lower plate. It is placed on the bench beside window to be exposed to sunlight, but not to direct sunrays, at room temperature. After about 30 mins water droplets started to appear on the lower face of the upper plate and increased in size with time. The obtained water droplets are collected in sterile container for analysis. The device is left on place for 24 hours. After the observation period, the volume of milk in the upper plate, is about 30 ml, i.e. 30 ml of water is removed from milk giving concentration of 50%.

In one embodiment, camel raw fresh milk is obtained from private farms and pasteurized at 100° C. for 10 minutes. A device similar to that described in step 2 is arranged with 60 ml milk in upper plate and 60 ml tap water in lower plate. It is placed on the bench beside window to be exposed to sunlight, but not to direct sunrays, at room temperature. After about 30 mins water droplets started to appear on the lower face of the upper plate and increased in size with time. The obtained water droplets are collected in sterile container to measure the volume and for analysis. The device is left on place for 24 hours. After the observation period, the volume of milk in the upper plate, is about 30 ml, i.e. 30 ml of water is removed from milk giving concentration of 50%. Analysis of droplets water indicates it is devoid of any milk nutrients with pH of about 7.1.

In one embodiment, water in fluid milk can be filtered by the present invention to give concentrated milk using sunlight energy only at room temperature (25° C.-27° C.).

As compared to other methods of concentration of milk, embodiments in the present disclosure have the following advantages:

1. It preserves energy as substantial amount of energy is needed to remove water from milk by boiling.
2. Constituents of milk are not affected because heat treatment of milk cause irreversible changes to quality.
3. A cheap method to pre-concentrate milk and then dehydrate by spraying to produce milk powder.
4. The technique is simple does not require complex equipment.
5. A green method with no greenhouse gases emission.

The details of one or more embodiments of the present invention are presented in the accompanying figures and the description below. Other features, objects, and advantages of the invention will be apparent from the description and figures and from the claims.

DETAILED DESCRIPTION OF THE SEVERAL EMBODIMENTS

To make the present disclosure clear, the following embodiments give detailed description.

Embodiment 1

Obtain pasteurized milk from commercial source to use for concentration of milk in a bench scale experiment.

Embodiment 2

Figure 1:
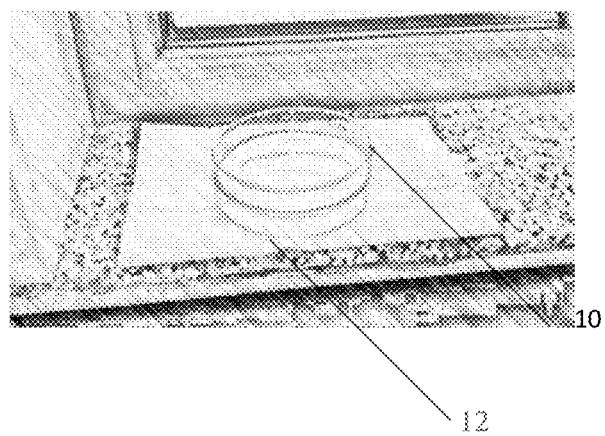
FIG. 1 illustrates the device for concentration of milk consists of two glass Petri dishes fixed one over the other according to embodiment 2.
Figure 2:
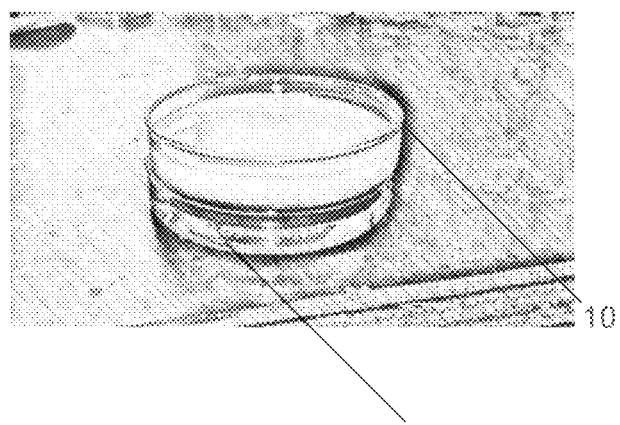
FIG. 2 illustrates the device of FIG. 1 for concentration of bovine milk in a bench scale experiment placed beside window to be exposed to sunlight, but not to direct sunrays, at room temperature according to embodiment 5.
Figure 3:
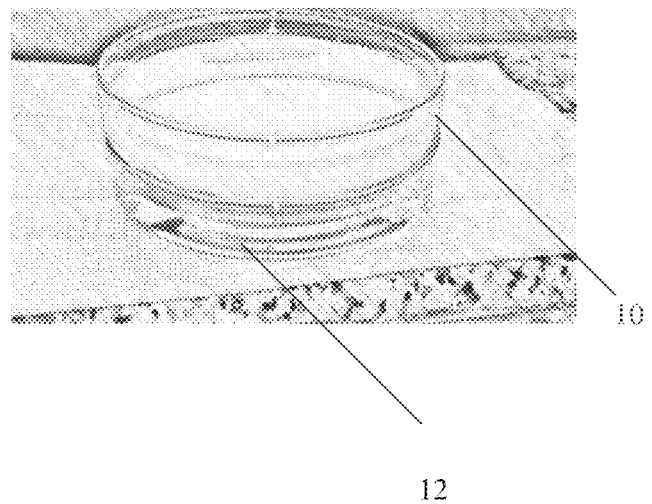
FIG. 3 illustrates the device of FIG. 1 for concentration of camel milk in a bench scale experiment placed beside window to be exposed to sunlight, but not to direct sunrays, at room temperature according to embodiment 6.

To perform the experiment, arrange two glass Petri dishes one as upper plate 10 and the other as lower plate 12 as depicted in FIGS. 1-3. Put 60 ml of tap water in the lower plate and 60 ml of pasteurized milk in the upper plate. This device will be used for concentration of milk.

Embodiment 3

Figure 4:
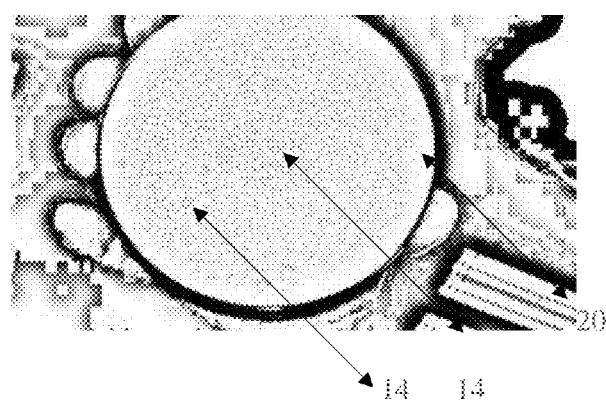
FIG. 4 illustrates water droplets started to appear on the lower face of the upper plate of the device for concentration of bovine milk in a bench scale experiment according to embodiment 3.

Milk concentration device described in embodiment 2, is placed on the bench beside window with no curtains, to be exposed to sunlight, but not to direct sunrays, at room temperature. It was observed that water droplets 14 started to appear on the lower surface 20 of the upper plate 10 that contain milk after about 30 minutes as depicted in FIG. 4.

Figure 5:
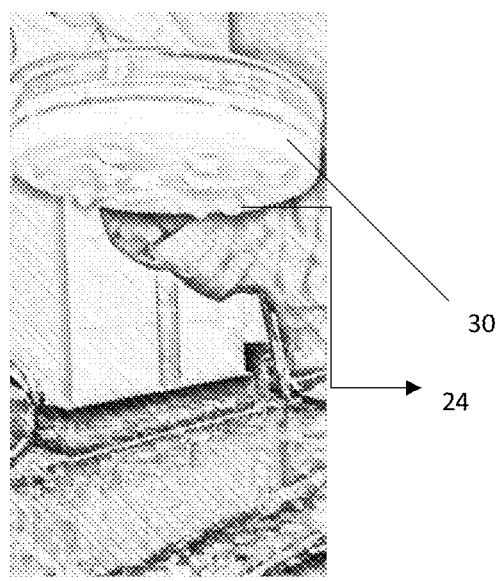
FIG. 5 illustrates water droplets hanging from the lower face of the upper plate of the device for concentration of camel milk in a bench scale experiment according to embodiment 3.

FIG. 5 shows water droplets 24 increase in size with time and start to fall downwards from the lower surface 30 of the upper plate. The obtained water droplets are collected in sterile container for analysis. Removal of water droplets lead to formation of new water droplets.

Embodiment 4

Observe concentration of milk for 24 hours by leaving the device described in embodiment 2 on place and continuously collect droplet water. After the observation period, the volume of milk in the upper plate, is about 30 ml, i.e. 30 ml of water is removed from milk giving concentration of 50%. To test the rate of milk concentration with time factor, arrange the device with 60 ml tap water in the lower plate and 60 ml milk in the upper plate. Leave the device for an observation period of 48 hours. After 24 hours, the volume of milk is about 30 ml giving concentration of 50% and after 48 hours, the volume of milk is about 10 ml i.e. 50 ml of water is removed giving concentration of 16.67%.

Embodiment 5

In another embodiment, bovine raw fresh milk is obtained from private farms and pasteurized at 100° C. for 10 minutes. The device described in embodiment 2 is used for concentration of milk where 60 ml pasteurized fresh milk is put in the upper plate and 60 ml tap water in the lower plate. It is placed on the bench beside window with no curtains, to be exposed to sunlight, but not to direct sunrays, at room temperature for 24 hours. After the observation period, the volume of milk in the upper plate, is about 30 ml, i.e. 30 ml of water is removed from milk giving concentration of 50%.

Embodiment 6

In another embodiment, camel raw fresh milk is obtained from private farms and pasteurized at 100° C. for 10 minutes. A device similar to that described in embodiment 2 is used for concentration of milk where 60 ml pasteurized camel fresh milk is put in the upper plate and 60 ml tap water in the lower plate. It is placed on the bench beside window with no curtains, to be exposed to sunlight, but not to direct sunrays, at room temperature for 24 hours. After the observation period, the volume of milk in the upper plate, is about 30 ml, i.e. 30 ml of water is removed from milk giving concentration of 50%.

REFERENCES

Ciurzyńska A and Lenart A. "Freeze-Drying—Application in Food Processing and Biotechnology—A Review". *Polish Journal of Food and Nutrition Sciences* 61.3 (2011): 165-171.

Yagil, R. and Etzion, Z. (1980). The effect of drought conditions on the quality of camel's milk. *Journal Dairy Research* 47: 159-166.

Rao, M. B., Gupta, R. C. and Dastur, N. N. (1970). Camels milk and milk products. *Indian Journal of Dairy Science*. 23: 71-78.

Shalash, M. R. (1979). Utilization of camel meat and milk in human nourishment. In: Camels. IFS Symposium, Sudan. Pp. 285-306.

El-Agamy, E. I., Ruppanner, R., Ismail, A., Champagne, C. P., Assaf, R., (1996). Purification and characterization of lactoferrin, lactoperoxidase, lysozyme and immunoglobulins from camel's milk. *International Dairy Journal*. 6: 129-145.

Yagil, R., Etzion, Z. and Ganani, J. (1978). Camel thyroid metabolism, effect of heat and dehydration. *Journal Applied Physiology* 45: 540-544.

Kudi, A. C., Kalla, D. J. U., Kudi, M. C. and Kapio, G. I. 1997. Brucellosis in Camel. J. Ari. Env., 37(2): 413-417.

Wiggins P (2008) Life Depends upon Two Kinds of Water. PLoS ONE 3(1): e1406. https://doi.org/10.1371/journal.pone.0001406

Wiggins, P. M. and van Ryn, R. T. (1986). The solvent properties of water in desalination membranes. J. Macromol. Sci. Chem. A23: 875-903.

Quan, S., H. Tsuda and T. Miyamoto. (2008). Heat treatment resulted in an increase in oral viscosity Angiotensin I converting enzyme inhibitory peptides in skim milk fermented with *Lactobacillus helveticus* 130B4 from camel milk in Inner Mongolia, China. *Journal of the Science of Food and Agriculture*. 88: 2688-2692.

Kolesnikov A. I., Reiter G. F., Choudhury N. et al. (2016). Quantum Tunneling of Water in Beryl: A New State of the Water Molecule. Phys. Rev. Lett. 116, 167802.

What is claimed is:

1. A method of concentrating fluid milk, the method comprising the steps of:
    fixing an upper container on a lower container to form a concentration structure;
    adding fluid milk in the upper container;
    adding water in the lower container;
    exposing the concentration structure under sunlight; and
    obtaining milk in the upper container;
    wherein droplets of water are collected from a lower surface of the upper container.

2. The method of claim 1 wherein the fluid milk is added in the upper container and a same volume of water is added in the lower container.

3. The method of claim 1 wherein the upper container and the lower container are glass Petri dishes of same size.

4. The method of claim 1 wherein the method is conducted at ambient temperature.

5. The method of claim 1 wherein the droplets of water are collected in a sterile container for analysis.

6. The method of claim 1 wherein the fluid milk is pasteurized at 100° C. for 10 minutes before being concentrated.

7. The method of claim 6 wherein pasteurized milk is added in the upper container and an equal volume of water is added in the lower container.

* * * * *